United States Patent
Ohta et al.

(10) Patent No.: US 8,117,736 B2
(45) Date of Patent: Feb. 21, 2012

(54) METHOD OF LAPPING A MAGNETIC HEAD SLIDER

(75) Inventors: Naoki Ohta, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 463 days.

(21) Appl. No.: 12/332,581

(22) Filed: Dec. 11, 2008

(65) Prior Publication Data

US 2010/0146774 A1    Jun. 17, 2010

(51) Int. Cl.
*G11B 5/127* (2006.01)
*H04R 31/00* (2006.01)

(52) U.S. Cl. ............ 29/603.1; 29/603.12; 29/603.13; 29/603.14; 29/603.16; 29/603.18; 451/5; 451/41; 360/121; 360/122; 360/317

(58) Field of Classification Search ............ 29/603.12, 29/603.13, 603.15, 603.16, 603.18; 451/5, 451/8, 10, 36, 37, 41
See application file for complete search history.

(56) References Cited

U.S. PATENT DOCUMENTS

| 5,991,698 A * | 11/1999 | Hao et al. ............ 702/65 |
| 2008/0168648 A1 * | 7/2008 | Hashimoto .......... 29/603.09 |
| 2009/0061737 A1 * | 3/2009 | Sudo et al. .............. 451/28 |

FOREIGN PATENT DOCUMENTS

| JP | 58-206219 | 12/1983 |
| JP | 05-040919 | 2/1993 |
| JP | 07-240010 | 9/1995 |
| JP | 10-269530 | 10/1998 |
| JP | 11-090818 | 4/1999 |
| JP | 2000-076630 | 3/2000 |
| JP | 2002-140706 | 5/2002 |

* cited by examiner

*Primary Examiner* — Paul D Kim
(74) *Attorney, Agent, or Firm* — Frommer Lawrence & Haug LLP

(57) ABSTRACT

A method of lapping a magnetic head slider includes a step of lapping a lapping surface of a row bar provided with a plurality of MR read head elements arranged along at least one line, a step of obtaining at least one output signal from at least one of the plurality of MR read head elements of the row bar during lapping, the at least one output signal corresponding to element resistance, a step of detecting at least one peak value of the obtained at least one output signal, and a step of controlling an amount of lapping of the row bar depending upon the detected at least one peak value.

10 Claims, 7 Drawing Sheets

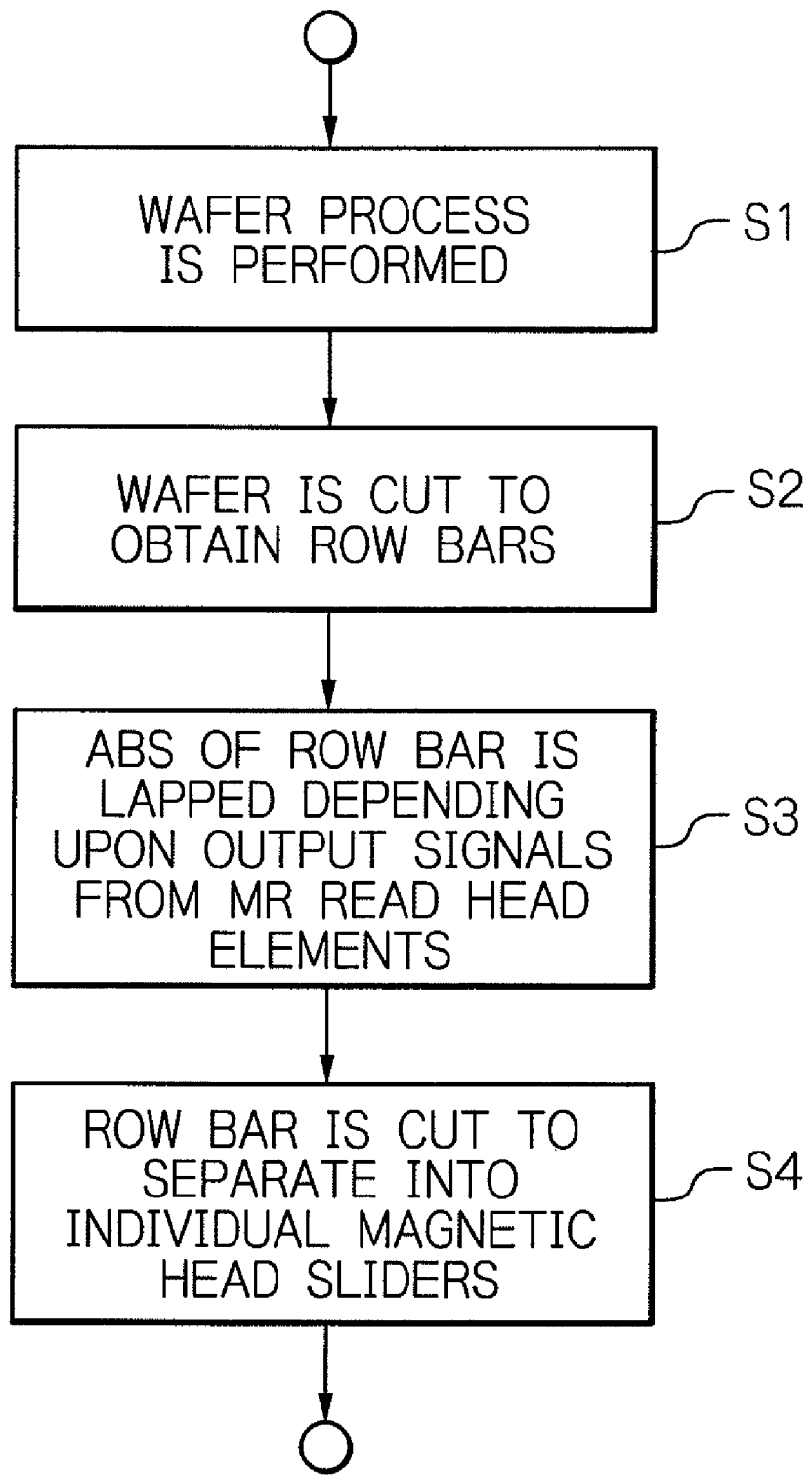

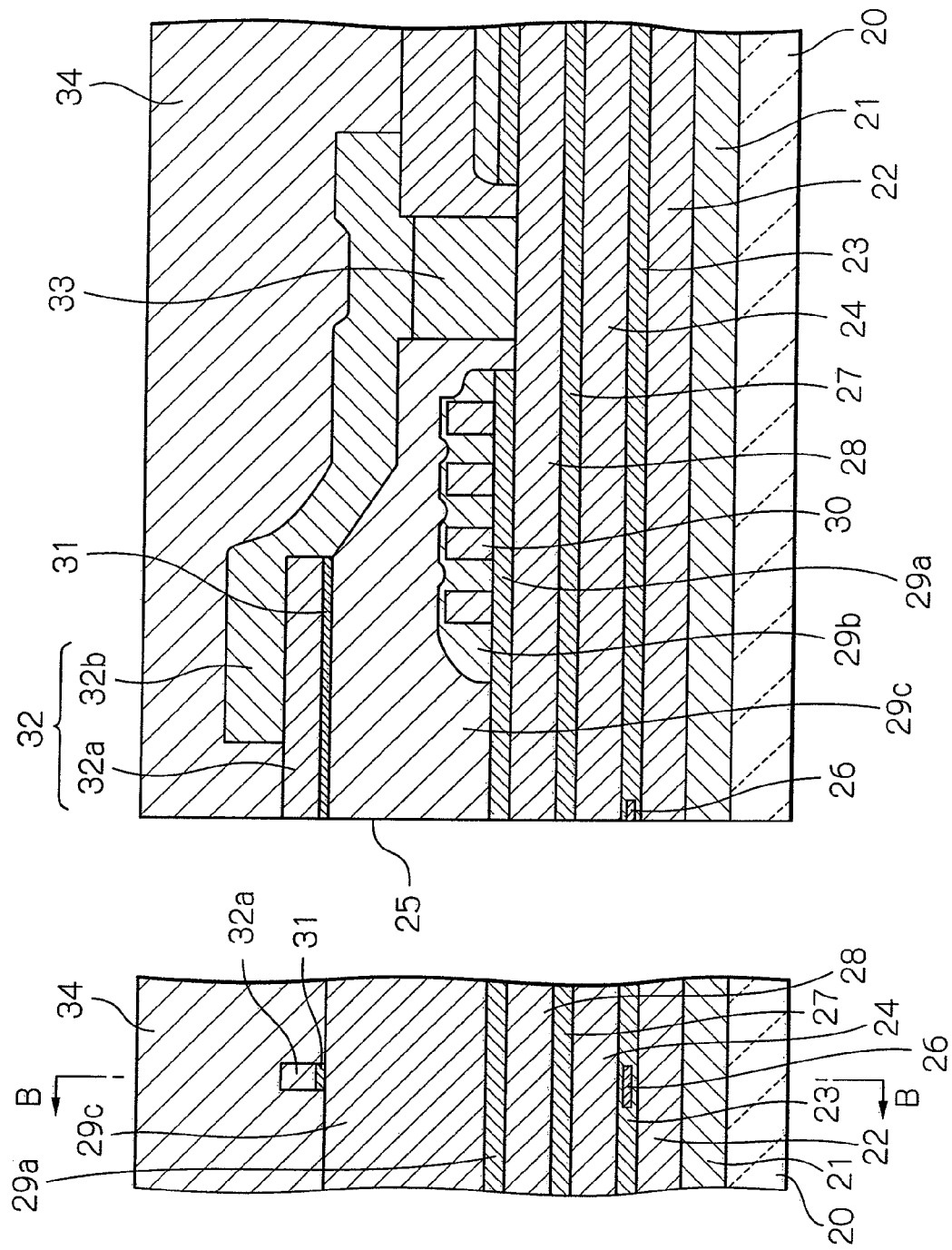

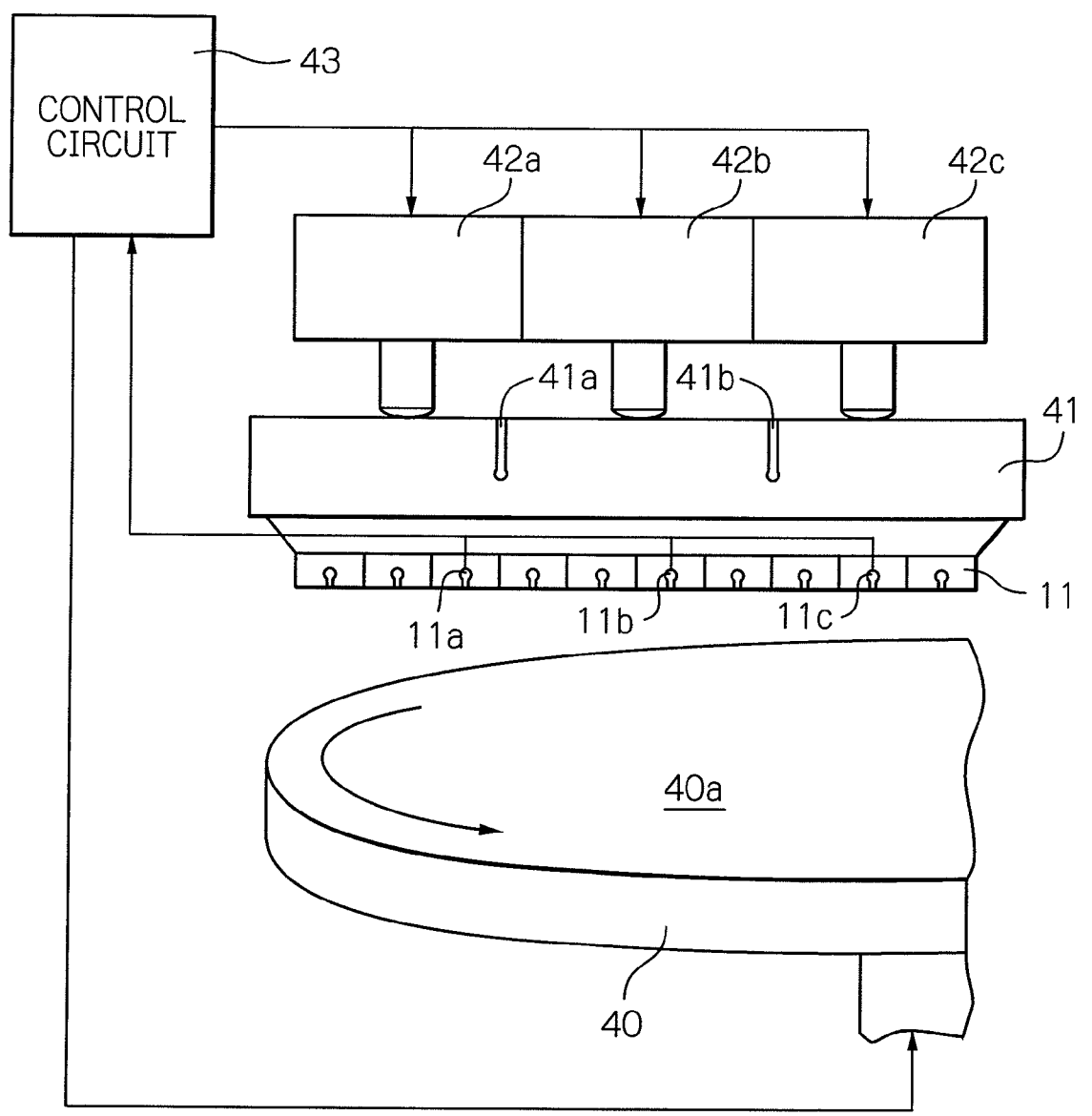

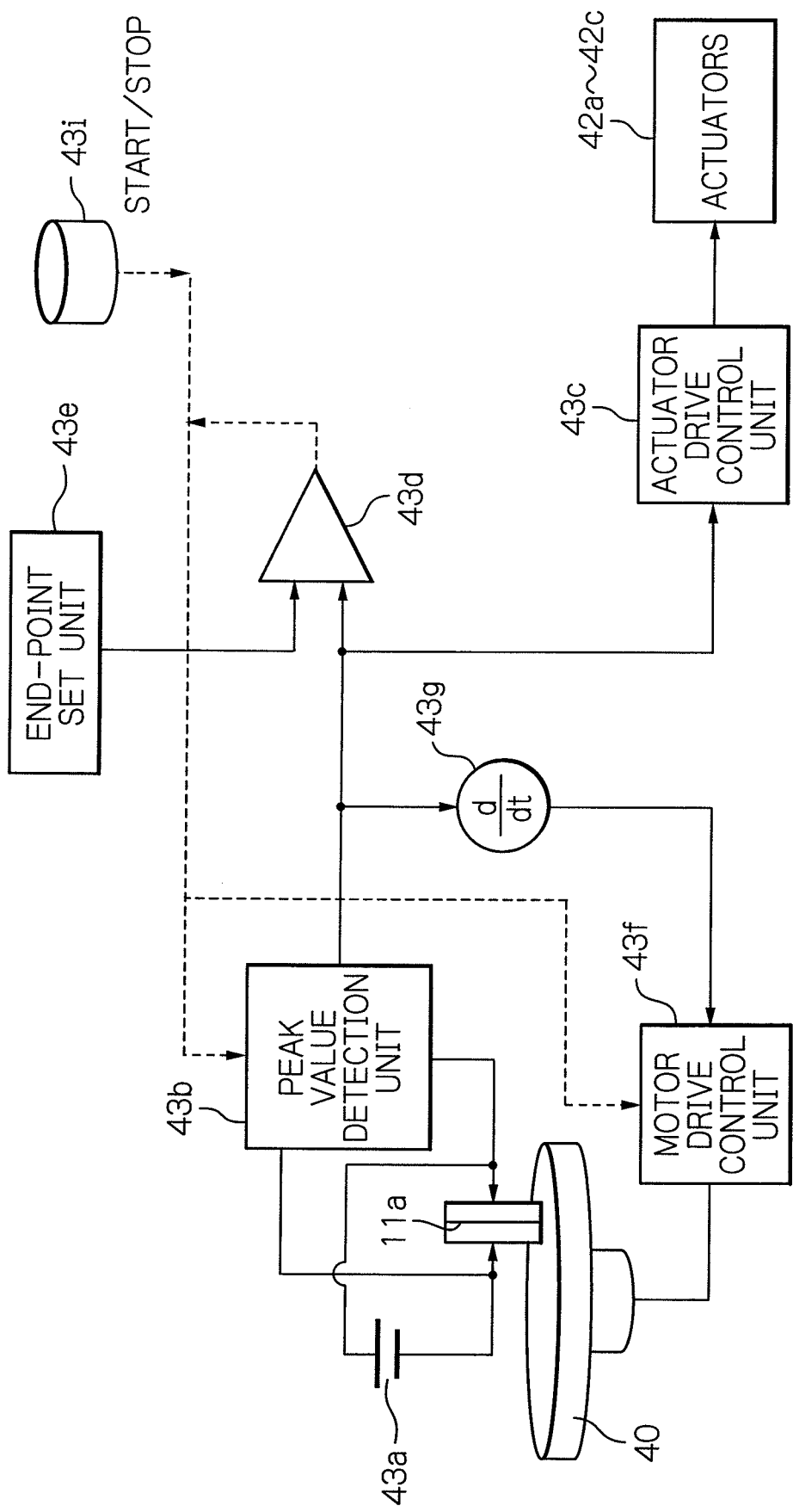

METHOD OF LAPPING A MAGNETIC HEAD SLIDER

BACKGROUND OF THE INVENTION

1. Field of the Invention

The present invention relates to a method and apparatus for lapping a magnetic head slider or a thin-film magnetic head so as to adjust an element height of the thin-film magnetic head, and to a manufacturing method of a thin-film magnetic head.

2. Description of the Related Art

Recently, in order to satisfy demand for higher recording capacity in a hard disk drive (HDD) apparatus, required are downsizing, narrowing of track and narrowing of gap in a thin-film magnetic head. Thus, when adjusting an element height of the magnetic head slider or the thin-film magnetic head, it is necessary to perform a precise and productive polishing process.

According to the conventional manufacturing method of a thin-film magnetic head, typically, a wafer provided with many magnetic head elements is first cut to separate into a plurality of row bars each of which has a plurality of the magnetic head elements aligned. Then, each row bar is lapped so as to adjust its element height to a defined size. When performing this lapping process, the row bar is pressed to a rotating lapping plate at a predetermined pressure to lap an air bearing surface (ABS) of the row bar.

In order to correctly adjust an element height such as for example a height of a magnetoresistive effect (MR) read head element (MR height, MRH) to a desired value, each row bar has a plurality of lapping control sensors formed by an MR film, called as resistance lapping guide (RLG) sensors, and electrical signals from these RLG sensors are monitored to control an amount of lapping.

However, when the MR read head element becomes extremely reduced in size, it becomes difficult to precisely recognize relationship in location between the MR read head elements and the RLG sensors in the row bar within its machining accuracy. As a result, resistance values of the MR read head elements in the row bar may greatly fluctuate.

If actual MR read head elements are used instead of the dedicated RLG sensors as the lapping control sensors and a lapping amount is obtained by monitoring resistance values of these actual MR read head elements, the aforementioned problem may be resolved. However, it should be noted that each actual MR read head element has lower and upper shield layers, and that a gap between the lower and upper shield layer and also a gap between each shield layer and the MR multi-layered structure are very narrow because of the micro size of the MR read head element. Therefore, smears or phenomenon in which the upper shield layer or the lower shield layer partially extends in the lapping direction due to its ductile property may sporadically occur during lapping. If smears occur, because the smears result electrical short circuits to reduce element resistance values to approximately zero, it becomes impossible to monitor correct element resistance values.

SUMMARY OF THE INVENTION

It is therefore an object of the present invention to provide a method and apparatus for lapping a magnetic head slider and a manufacturing method of a thin-film magnetic head, whereby precision in lapping can be more improved without using a dedicated lapping sensor such as an RLG sensor.

It is another object of the present invention to provide a method and apparatus for lapping a magnetic head slider and a manufacturing method of a thin-film magnetic head, whereby a correct element resistance value can be obtained even if there occur smears that will be certainly produced when lapping actual MR read head elements.

According to the present invention, a method of lapping a magnetic head slider includes a step of lapping a lapping surface of a row bar provided with a plurality of MR read head elements arranged along at least one line, a step of obtaining at least one output signal from at least one of the plurality of MR read head elements of the row bar during lapping, the at least one output signal corresponding to element resistance, a step of detecting at least one peak value of the obtained at least one output signal, and a step of controlling an amount of lapping of the row bar depending upon the detected at least one peak value.

Instead of dedicated lapping control sensors such as RLG sensors, at least one actual MR read head element for reproducing magnetic recording information is used as the lapping control sensors. In order to eliminate an influence of smears that will occur during lapping, at least one peak value of at least one output signal from at least one of the MR read head elements, which at least one peak value corresponds to element resistance of the at least one MR read head element, is detected and a lapping amount of the row bar is controlled depending upon the detected at least one peak value. During lapping, if a smear occurs, this smear functions as a low resistance resistor connected in parallel to the MR read head element or a conductor for short-circuiting the MR read head element. However, the occurred smear will disappear in short period due to the lapping of the smear itself resulting recover of the original output of the MR read head element. Further, since the element resistance of the MR read head element increases with the progress of lapping, the output level from the MR read head element also increases. Therefore, by detecting the peak value of the output of the MR read head element, it is possible to obtain a control signal for lapping with no influence of smears that will occur during lapping. As a result, even when the MR read head element becomes extremely reduced in size, it is possible to perform a precise lapping control using actual MR read head elements as the lapping control sensors.

It is preferred that the step of detecting at least one peak value includes a step of sample-holding each obtained output signal in a short period.

It is also preferred that the step of controlling an amount of lapping includes a step of comparing the detected at least one peak value with a threshold value to provide a comparison result, and a step of stopping the lapping of the row bar depending upon the comparison result.

It is further preferred that the method further includes a step of detecting a changing rate of the detected peak value, and a step of controlling a lapping rate of the row bar depending upon the detected changing rate. In this case, more preferably, the step of detecting a changing rate includes obtaining a time-rate-of-change of the detected peak value. Also, more preferably, the step of controlling a lapping rate includes controlling a rotational speed of a lapping plate to which the lapping surface of the row bar is pressed.

According to the present invention, also, an apparatus for lapping a magnetic head slider, includes a support member for fixing a row bar provided with a plurality of MR read head elements arranged along at least one line, a lapping plate to which a lapping surface of the row bar being pressed during lapping, at least one peak value detection means for detecting at least one peak value of at least one output signal obtained from at least one of the plurality of MR read head elements of the row bar during lapping, the at least one output signal corresponding to element resistance, and means for controlling an amount of lapping of the row bar depending upon the at least one peak value detected by the at least one peak value detection means.

Instead of dedicated lapping control sensors such as RLG sensors, at least one actual MR read head element for reproducing magnetic recording information is used as the lapping control sensors. In order to eliminate an influence of smears that will occur during lapping, at least one peak value of at least one output signal from at least one of the MR read head elements, which at least one peak value corresponds to element resistance of the at least one MR read head element, is detected and a lapping amount of the row bar is controlled depending upon the detected at least one peak value. During lapping, if a smear occurs, this smear functions as a low resistance resistor connected in parallel to the MR read head element or a conductor for short-circuiting the MR read head element. However, the occurred smear will disappear in short period due to the lapping of the smear itself resulting recover of the original output of the MR read head element. Further, since the element resistance of the MR read head element increases with the progress of lapping, the output level from the MR read head element also increases. Therefore, by detecting the peak value of the output of the MR read head element, it is possible to obtain a control signal for lapping with no influence of smears that will occur during lapping. As a result, even when the MR read head element becomes extremely reduced in size, it is possible to perform a precise lapping control using actual MR read head elements as the lapping control sensors.

It is preferred that the at least one peak value detection means includes a sample hold circuit for sample-holding each obtained output signal in a short period.

It is also preferred that the control means includes means for comparing the detected at least one peak value with a threshold value to provide a comparison result, and means for stopping the lapping of the row bar depending upon the comparison result.

It is further preferred that the apparatus further includes a changing rate detection means for detecting a changing rate of the detected peak value, and a lapping rate control means for controlling a lapping rate of the row bar depending upon the changing rate detected by the changing rate detection means. In this case, more preferably, the changing rate detection means includes a differentiation means for obtaining a time-rate-of-change of the detected peak value. Also, more preferably, the lapping rate control means includes means for controlling a rotational speed of a lapping plate to which the lapping surface of the row bar is pressed.

According to the present invention, furthermore, a manufacturing method of a thin-film magnetic head, includes a step of forming on a wafer many of thin-film magnetic head elements, each thin-film magnetic head element including a MR read head element and an inductive write head element, a step of cutting the wafer to obtain row bars, each row bar being provided with a plurality of the thin-film magnetic head elements arranged along at least one line, a step of lapping a lapping surface of the row bar, a step of obtaining at least one output signal from at least one of the MR read head elements of the row bar during lapping, the at least one output signal corresponding to element resistance, a step of detecting at least one peak value of the obtained at least one output signal, a step of controlling an amount of lapping of the row bar depending upon the detected at least one peak value, and a step of cutting the lapped row bar to separate into individual thin-film magnetic heads, each thin-film magnetic head including the thin-film magnetic head element.

Instead of dedicated lapping control sensors such as RLG sensors, at least one actual MR read head element for reproducing magnetic recording information is used as the lapping control sensors. In order to eliminate an influence of smears that will occur during lapping, at least one peak value of at least one output signal from at least one of the MR read head elements, which at least one peak value corresponds to element resistance of the at least one MR read head element, is detected and a lapping amount of the row bar is controlled depending upon the detected at least one peak value. During lapping, if a smear occurs, this smear functions as a low resistance resistor connected in parallel to the MR read head element or a conductor for short-circuiting the MR read head element. However, the occurred smear will disappear in short period due to the lapping of the smear itself resulting recover of the original output of the MR read head element. Further, since the element resistance of the MR read head element increases with the progress of lapping, the output level from the MR read head element also increases. Therefore, by detecting the peak value of the output of the MR read head element, it is possible to obtain a control signal for lapping with no influence of smears that will occur during lapping. As a result, even when the MR read head element becomes extremely reduced in size, it is possible to perform a precise lapping control using actual MR read head elements as the lapping control sensors.

It is preferred that the step of detecting at least one peak value includes a step of sample-holding each obtained output signal in a short period.

It is also preferred that the step of controlling an amount of lapping includes a step of comparing the detected at least one peak value with a threshold value to provide a comparison result, and a step of stopping the lapping of the row bar depending upon the comparison result.

It is further preferred that the method further includes a step of detecting a changing rate of the detected peak value, and a step of controlling a lapping rate of the row bar depending upon the detected changing rate. In this case, more preferably, the step of detecting a changing rate includes obtaining a time-rate-of-change of the detected peak value. Also, more preferably, the step of controlling a lapping rate includes controlling a rotational speed of a lapping plate to which the lapping surface of the row bar is pressed.

Further objects and advantages of the present invention will be apparent from the following description of the preferred embodiments of the invention as illustrated in the accompanying drawings.

BRIEF DESCRIPTION OF THE DRAWINGS

FIG. 1 shows a flow chart extremely schematically illustrating a manufacturing process of a thin-film magnetic head in an embodiment according to the present invention;

FIGS. 3a and 3b illustrate a layer structure example of the thin-film magnetic head finally fabricated by the manufacturing process according to the present invention, where FIG. 3a shows a sectional view seen from an ABS side and FIG. 3b shows a sectional view seen along a B-B line of FIG. 3a;

FIG. 4 shows a view schematically illustrating a configuration of a main part in a lapping apparatus in the embodiment according to the present invention;

FIG. 5 shows a circuit diagram schematically illustrating an electrical structure of the lapping apparatus in the embodiment according to the present invention;

DESCRIPTION OF THE PREFERRED EMBODIMENTS

Figure 2A:
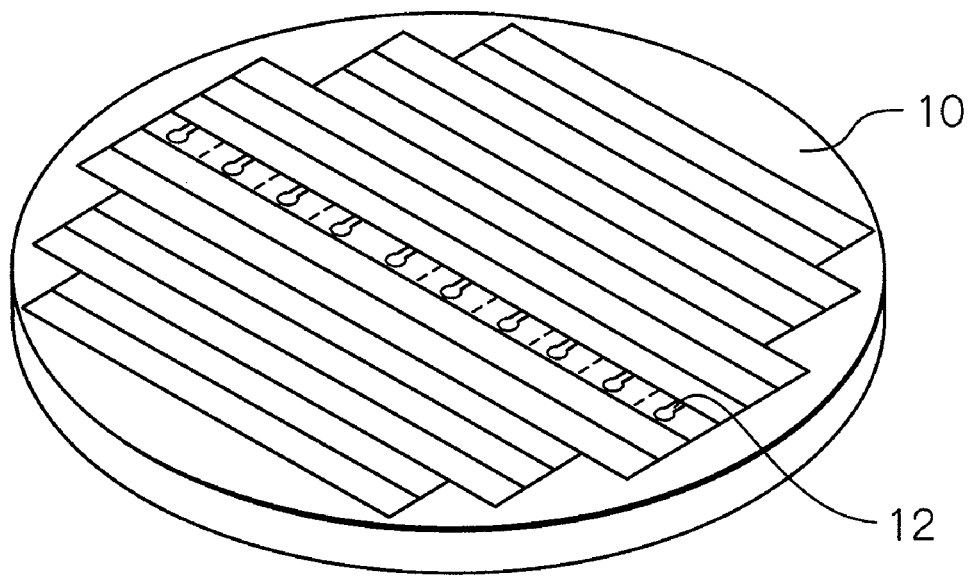
FIGS. 2a and 2b show perspective views illustrating a wafer and a row bar fabricated in the manufacturing process shown in FIG. 1, respectively.
Figure 2B:
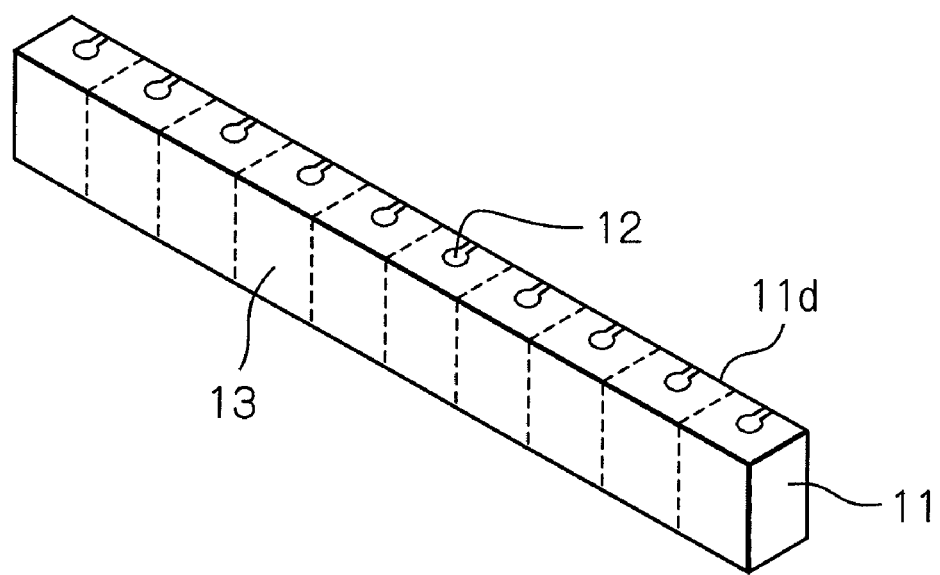

FIG. 1 extremely schematically illustrates a manufacturing process of a thin-film magnetic head in an embodiment according to the present invention, and FIGS. 2a and 2b illustrate a wafer and a row bar fabricated in the manufacturing process shown in FIG. 1, respectively. Hereinafter, the whole manufacturing process of the thin-film magnetic head according to the present invention will be schematically described with reference to these figures.

At first, a wafer process is performed (Step S1). In this wafer process, many thin-film magnetic head elements are formed by a thin-film technology on a wafer 10 made of a ceramic material such as AlTiC ($Al_2O_3$—TiC). Each thin-film magnetic head element is provided with a magnetoresistive effect (MR) read head element such as a tunnel magnetoresistive effect (TMR) head element or a giant magnetoresistive effect (GMR) head element, and an inductive write head element such as an in-plane or horizontal magnetic recording write head element or a perpendicular magnetic recording write head element.

Then, a machining process is performed. In this process, first, the wafer 10 is cut into a plurality of blocks, and then each block is further cut to obtain a plurality of row bars 11 (Step S2). On each row bar, a plurality of thin-film magnetic head elements 12 are aligned.

Then, a necessary machining step such as forming of grooves or rails is performed, and thereafter, an ABS 11d of each row bar 11 is lapped to control characteristics of the thin-film magnetic head element 12 (Step S3). This lapping is performed using a lapping method and apparatus of the present invention described below. Namely, the ABS 11d of the row bar is lapped to adjust an MRH of the MR read head element and a throat height (TH) in the magnetic pole gap of the horizontal magnetic recording write head element or a neck height (NH) of the perpendicular magnetic recording write head element depending upon output signals from actual MR read head elements without using any RLG sensor.

Then, a crown adjustment or a touch lapping for finishing the lapped surface of the row bar 11 is performed, and thereafter this row bar is cut to separate into individual thin-film magnetic heads or magnetic head sliders 13 (Step S4).

FIGS. 3a and 3b illustrate an example of the thin-film magnetic head finally fabricated by the manufacturing process according to the present invention. FIG. 3a is a sectional view seen from an ABS side and FIG. 3b is a sectional view seen along a B-B line of FIG. 3a.

As shown in these figures, on a substrate or wafer 20 made of a ceramic material such as AlTiC ($Al_2O_3$—TiC), an insulation layer 21 made of for example alumina ($Al_2O_3$) or else, a lower shield and electrode layer 22 made of for example permalloy (NiFe) or else, a shield gap layer 23 made of for example alumina or else, and an upper shield and electrode layer 24 made of for example permalloy (NiFe) or else are sequentially stacked. An MR multi-layered structure 26 such as a TMR multi-layered structure or a GMR multi-layered structure is formed within the shield gap layer 23. One end of the MR multi-layered structure 26 is terminated at the ABS 25 that is covered by a coating layer (not shown). The lower shield and electrode layer 22, the shield gap layer 23, the upper shield and electrode layer 24 and the MR multi-layered structure 26 configure an MR read head element.

On the upper shield and electrode layer 24, a separation layer 27 made of for example alumina or else, and an auxiliary pole layer 28 made of for example permalloy or else are sequentially stacked. On the auxiliary pole layer 28, gap layers 29a, 29b and 29c made of for example alumina, oxide silicon ($SiO_2$) or else, and a thin-film coil 30 made of for example copper (Cu) and enveloped by the gap layers 29a, 29b and 29c are formed.

A seed layer 31, and a pole section 32a and a yoke section 32b of a main pole layer 32 made of for example permalloy or else are stacked on the gap layer 29c. A top end part of the pole section 32a of the main pole 32 is in most cases formed by a certain material with a saturated magnetic flux density higher than that of permalloy. The yoke section 32b of the main pole 32 is magnetically coupled with the auxiliary pole layer 28 via a coupling section 33 located at a point distance from the ABS 25. An overcoat layer 34 made of for example alumina or else is formed on the thin-film coil 30 and the main pole layer 33. The auxiliary pole layer 28, the gap layers 29a, 29b and 29c, the thin-film coil 30, the main pole layer 32, and the coupling section 33 configure an inductive write head element.

As will be understood from FIGS. 3a and 3b and the above description, the thin-film magnetic head in this embodiment is a composite type thin-film magnetic head with the MR read head element and the perpendicular magnetic recording write head element formed thereon for generating recording magnetic field in a direction perpendicular to a surface of a recording medium.

Figure 6:
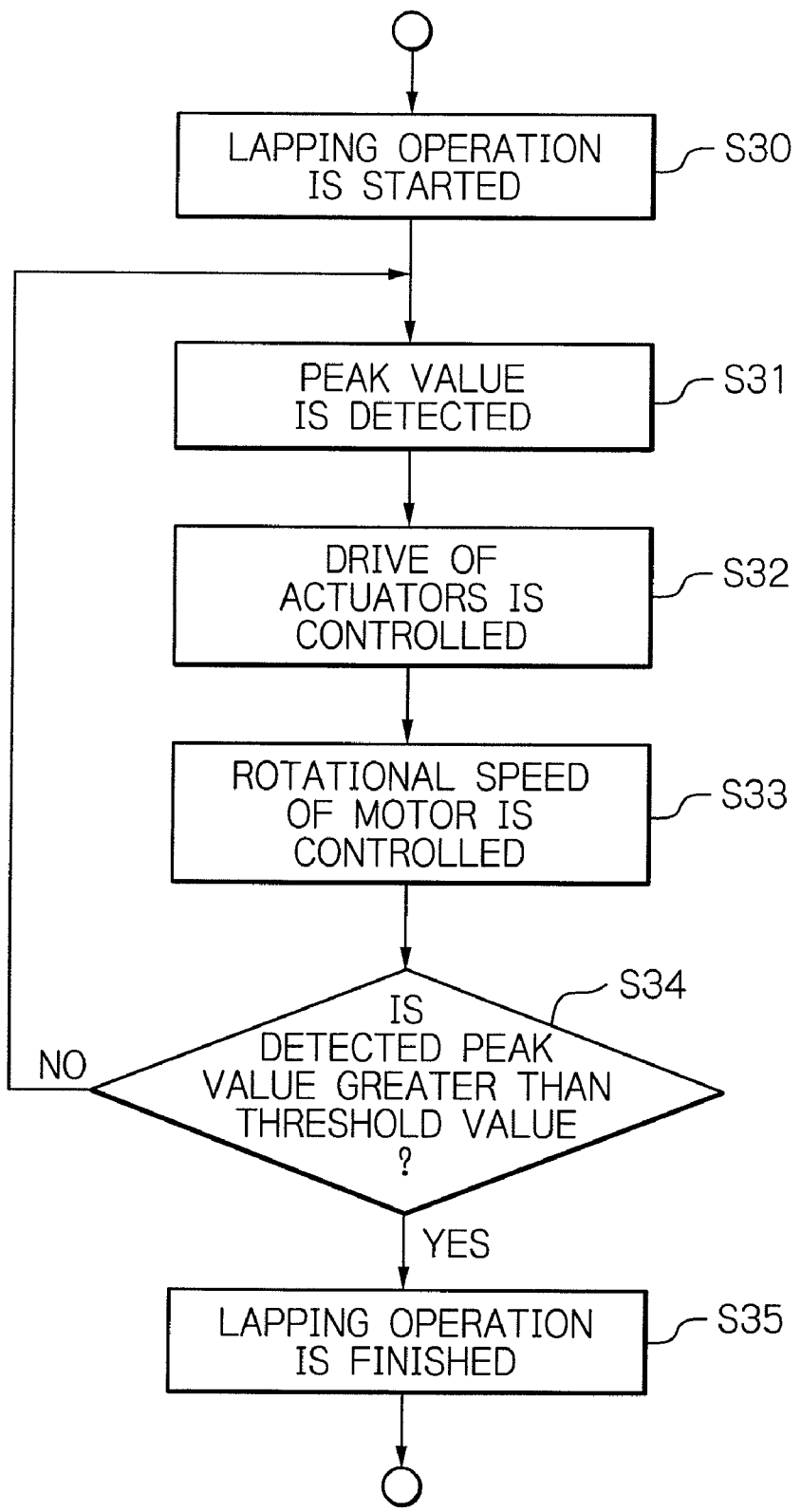
FIG. 6 shows a flow chart schematically illustrating a lapping process in the embodiment according to the present invention.
Figure 7:
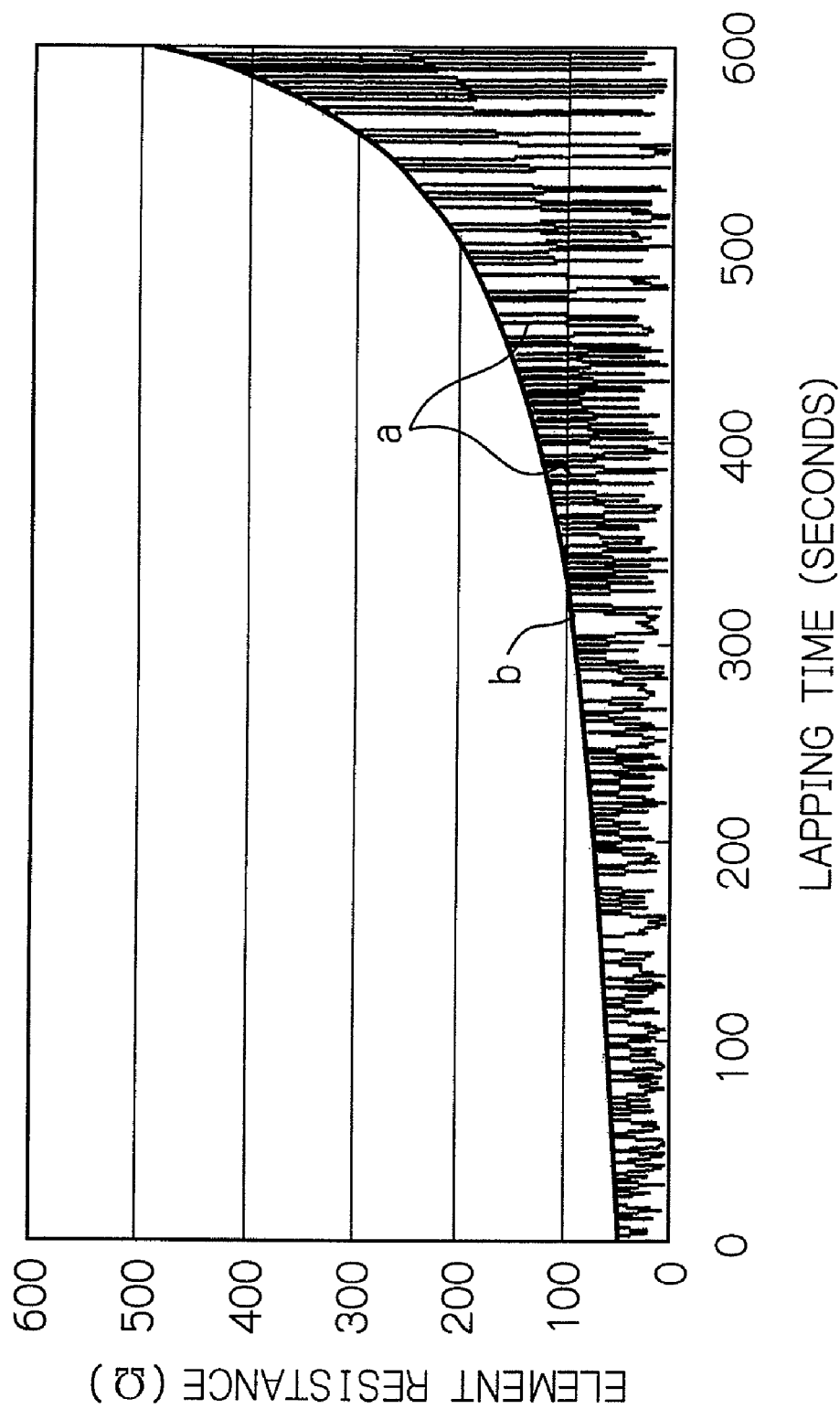
FIG. 7 shows a graph illustrating a relationship between an element resistance value and a peak value output of an MR read head element and a lapping time or lapping amount when no feedback control is performed.

FIG. 4 schematically illustrates a configuration of a main part in a lapping apparatus in the embodiment according to the present invention, FIG. 5 schematically illustrates an electrical structure of the lapping apparatus, FIG. 6 schematically illustrates a flow of a lapping process, and FIG. 7 illustrates a relationship between an element resistance value and a peak value output of the MR read head element and a lapping time or lapping amount when no feedback control is performed.

In FIG. 4, reference numeral 40 denotes a rotatable lapping plate made of for example tin (Sn) or else and provided with a diamond abrasive coating surface 40a, 41 denotes a support jig for holding the row bar 11 on its one surface, 42a-42c denote actuators for pressing the row bar 11 toward the lapping plate 40, and 43 denotes a control circuit, respectively. The control circuit 43 controls the actuators 42a-42c depending upon output signals from a plurality of MR read head element 11a-11c and also controls start and stop of rotation and a rotational speed of the lapping plate 40.

The support jig 41 has slits 41a and 41b at positions for equally dividing the jig along its longitudinal direction so that this support jig 41 can slightly bend. In the figure, the slits 41a and 41b divide the jig equally among three, along the longitudinal direction. The actuators 42a-42c are configured to press the respective three portions of the jig 41 equally divided into three by the slits 41a and 41b.

Output terminals of the MR read head elements 11a-11c of the row bar 11 are electrically connected to the control circuit 43. The control circuit 43 therefore drives the actuators 42a-42c based upon changed amounts of element resistance values represented by the output signals from the respective MR read head elements 11a-11c, so that the row bar 11 is pressed to the lapping plate 40 with uniform pressure along its longitudinal direction.

The electrical structure of the lapping apparatus in this embodiment will be hereinafter described in detail with reference to FIG. 5.

As shown in the figure, from a constant current source 43*a* in the control circuit 43, a sense current is supplied to each MR read head element, for example the MR read head element 11*a*, of the row bar 11. The output signal from the MR read head element 11*a* is applied to a peak value detection unit 43*b* in the control circuit 43 to detect its peak value. In this embodiment, a modified sample hold circuit for example for holding its input signal in a short cycle is used as the peak value detection unit 43*b*. However, any circuit capable of detecting a peak value may be utilized as the peak value detection unit 43*b* instead of the sample hold circuit.

An output signal from the peak value detection unit 43*b* is applied to an actuator drive control unit 43*c* for controlling the drive of the actuator 42*a*, and also to a comparator 43*d*. In FIG. 5, only the MR read head element 11*a* and the peak value detection unit 43*b* connected to this MR read head element 11*a* are illustrated in order to simplify the configuration. However, in practice, the control circuit 43 has another peak value detection units connected to the MR read head elements 11*b* and 11*c*. Output signals from these peak value detection units are applied to the actuator drive control unit 43*c* for controlling the drive of each of the actuators 42*b* and 42*c*.

The comparator 43*d* compares a detected peak value represented by the output signal from the peak value detection unit 43*b* with a threshold value corresponding to an end point value of lapping, defined in an end-point set unit 43*e*. When the detected peak value exceeds the threshold value, a signal is output from the comparator 43*d*. This signal from the comparator 43*d* is applied to a motor drive control unit 43*f* for controlling the drive of the motor of the rotatable lapping plate 40 so as to stop the motor rotation.

The output signal from the peak value detection unit 43*b* is further applied to a differentiation unit 43*g*. The differentiation unit 43*g* provides a control output with a value corresponding to a changed amount of the detected peak value per unit time, that is a changed amount of element resistance value of the MR read head element 11*a* per unit time. This control output is applied to the motor drive control unit 43*f* for controlling the rotational speed of the motor. Namely, when the changed amount of element resistance value per unit time increases, it is controlled to lower the rotational speed of the motor. Whereas, when the changed amount of element resistance value per unit time decreases, it is controlled to raise the rotational speed of the motor.

Start and stop of rotation of the lapping plate 40 and also start and stop of operations of the control circuit 43 can be controlled in response to manipulation of a start/stop instruction unit 43*i*.

Next, operations and functions of this lapping apparatus will be described with reference to FIGS. 6 and 7.

First, the row bar 11 to be lapped is mounted on the support jig 41 of the lapping apparatus and set at an initial position. Then, as shown in FIG. 6, a lapping operation is started in response to instructions from the start/stop instruction unit 43*i* (Step S30). Thus, the motor starts its rotation to rotate the lapping plate 40, a sense current is supplied to the MR read head element 11*a*, and the peak value detection unit 43*b* starts peak value detection operation.

During lapping, an element resistance value of each of the actual MR read head elements 11*a*-11*c* frequently repeats abrupt variation or fluctuation with respect to a lapping time as shown by reference symbol a in FIG. 7. That is, during lapping, occurrence of a smear that functions as a low resistance resistor connected in parallel to the MR read head element or a conductor for short-circuiting the MR read head element and disappearance of the occurred smear due to the lapping of the smear itself resulting recover of the original output of the MR read head element are repeated at short intervals.

According to the present invention, therefore, the peak value of the fluctuated output signal from the MR read head element is obtained by the peak value detection unit as shown by reference symbol b in FIG. 7 (Step S31). As will be mentioned later, according to the present invention, the obtained peak value outputs are used as the lapping control signals, so as to eliminate an influence of possible smears occurred during lapping.

The obtained or detected peak value outputs from the peak value detection units are applied to the actuator drive control unit 43*c* to control the drive of each of the actuators 42*a*-42*c* (Step S32). Thus, the row bar 11 is pressed to the lapping plate 40 with uniform pressure along its longitudinal direction and under this state lapping of the row bar 11 is performed.

The detected peak value output is applied to the differentiation unit 43*g* to obtain a changed amount of element resistance value of the MR read head element per unit time. The control output representing the obtained changed amount of element resistance value is applied to the motor drive control unit 43*f* and thus the rotational speed of the motor, that is the rotational speed of the lapping plate 40, is controlled (Step S33).

In general, a changed amount of element resistance value per unit time during lapping is not kept constant for the whole lapping process but increased when approaching the end of the lapping process of the row bar 11. Namely, the element resistance will change depending upon an inverse number of a pattern area of the element. When the changed amount of element resistance value per unit time increases, an error of element resistance will increase. Therefore, in order to precisely control the end point of lapping, it is necessary to keep the error of the element resistance constant even when approaching the end of the lapping process. Thus, in this embodiment, a changed amount of element resistance value per unit time during lapping is obtained by the differentiation unit 43*g*, a feedback control is performed by controlling the rotational speed of the lapping plate 41 depending upon the signal that represents the changed amount so as to keep the lapping rate constant and to keep the error of the element resistance constant even when approaching the end of the lapping process.

Thereafter, the obtained or detected peak value output from the peak value detection unit 43*b* is applied to the comparator 43*d* to compare the detected peak value with the threshold value corresponding to an end point value of lapping, defined in the end-point set unit 43*e*. Thus, it is judged whether the detected peak value is greater than the threshold value or not (Step S34).

If the peak value is not greater than the threshold value, it is judged that the row bar has not been lapped to the end point yet, and thus the lapping operation is carried on with repeating the process in Steps S31-S34. If the peak value exceeds the threshold value, the rotation of the lapping plate 40 is stopped and thus the lapping operation is finished (Step S35).

As aforementioned, according to this embodiment, instead of dedicated lapping control sensors such as RLG sensors, actual MR read head elements for reproducing magnetic recording information are used as the lapping control sensors. In order to eliminate an influence of smears that will occur during lapping, peak values of outputs from the MR read head elements, which correspond to element resistances of the respective MR read head elements, are detected and a lapping amount of the row bar is controlled depending upon the detected peak values. As a result, even when the MR read head element becomes extremely reduced in size, it is possible to perform a precise lapping control using actual MR read head elements as the lapping control sensors. Also, according to this embodiment, since the lapping rate is controlled to keep a changed amount of element resistance value of the MR read head element per unit time constant, it is possible to converge an amount of read error produced due to occurrence of smear to a constant value. The amount of the error is determined in accordance with the probability of occurrence of smear. The probability of occurrence of smear depends upon materials of the MR multi-layered structure and the shield layers of the MR read head element. Thus, by performing a preliminary test lapping to estimate the amount of error, a highly precise lapping can be expected.

In the above-mentioned embodiment, it is desired to reduce a peak detection period of the peak detection unit as short as possible so as to lower an error amount with respect to a true value. In this case, the obtained error will estimate the element resistance lower than the true value. The peak detection unit may be desirably realized by hardware to detect the peak value in real time. However, if it is possible to sufficiently reduce the peak detection period, the peak detection unit may be realized by software.

In the aforementioned embodiment, the rotational speed of the lapping plate 40 is controlled depending upon a changed amount of element resistance value per unit time so as to keep the lapping rate constant and to keep the error of the element resistance constant even when approaching the end of the lapping process. However, in modifications, pressed forces of the row bar 11 to the lapping plate 40 may be controlled by means of the actuators 42a-42c depending upon a changed amount of element resistance value per unit time so as to keep the lapping rate constant and to keep the error of the element resistance constant even when approaching the end of the lapping process.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A method of lapping a magnetic head slider, comprising the steps of:
    lapping a lapping surface of a row bar provided with a plurality of magnetoresistive effect read head elements arranged along at least one line;
    obtaining at least one output signal from at least one of said plurality of magnetoresistive effect read head elements of said row bar during lapping, said at least one output signal corresponding to element resistance;
    detecting at least one peak value of the obtained at least one output signal;
    detecting a changing rate of the detected at least one peak value;
    controlling an amount of lapping of said row bar depending upon the detected at least one peak value; and
    controlling a lapping rate of said row bar depending upon the detected changing rate.

2. The method as claimed in claim 1, wherein said step of detecting at least one peak value comprises a step of sampling and holding each obtained output signal in a short period.

3. The method as claimed in claim 1, wherein said step of controlling an amount of lapping comprises a step of comparing the detected at least one peak value with a threshold value to provide a comparison result, and a step of stopping the lapping of said row bar depending upon the comparison result.

4. The method as claimed in claim 1, wherein said step of detecting a changing rate comprises obtaining a time-rate-of-change of the detected peak value.

5. The method as claimed in claim 1, wherein said step of controlling a lapping rate comprises controlling a rotational speed of a lapping plate to which the lapping surface of said row bar is pressed.

6. A manufacturing method of a thin-film magnetic head, comprising the steps of:
    forming on a wafer many of thin-film magnetic head elements, each thin-film magnetic head element including a magnetoresistive effect read head element and an inductive write head element;
    cutting said wafer to obtain row bars, each row bar being provided with a plurality of said thin-film magnetic head elements arranged along at least one line;
    lapping a lapping surface of said row bar;
    obtaining at least one output signal from at least one of said magnetoresistive effect read head elements of said row bar during lapping, said at least one output signal corresponding to element resistance;
    detecting at least one peak value of the obtained at least one output signal;
    detecting a changing rate of the detected at least one peak value;
    controlling an amount of lapping of said row bar depending upon the detected at least one peak value;
    controlling a lapping rate of said row bar depending upon the detected changing rate; and
    cutting the lapped row bar to separate into individual thin-film magnetic heads, each thin-film magnetic head including the thin-film magnetic head element.

7. The manufacturing method as claimed in claim 6, wherein said step of detecting at least one peak value comprises a step of sampling and holding each obtained output signal in a short period.

8. The manufacturing method as claimed in claim 6, wherein said step of controlling an amount of lapping comprises a step of comparing the detected at least one peak value with a threshold value to provide a comparison result, and a step of stopping the lapping of said row bar depending upon the comparison result.

9. The manufacturing method as claimed in claim 6, wherein said step of detecting a changing rate comprises obtaining a time-rate-of-change of the detected peak value.

10. The manufacturing method as claimed in claim 6, wherein said step of controlling a lapping rate comprises controlling a rotational speed of a lapping plate to which the lapping surface of said row bar is pressed.

* * * * *